Dec. 23, 1941.  O. W. BECKER  2,267,488
METHOD AND APPARATUS FOR PRODUCING SAUSAGE SKINS
Filed Nov. 12, 1937
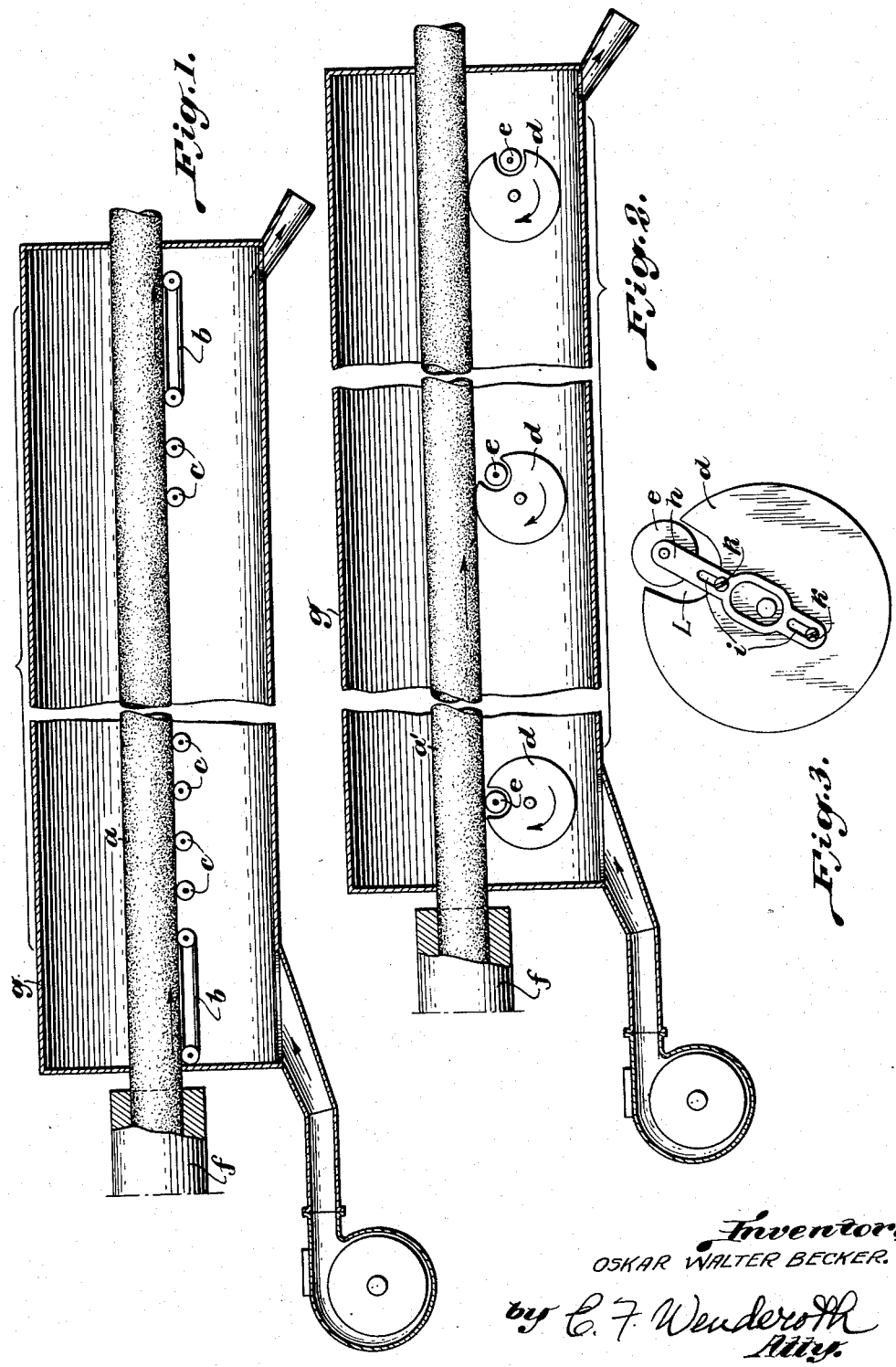
Inventor,
OSKAR WALTER BECKER.
by C. F. Wenderoth
Atty.

Patented Dec. 23, 1941

2,267,488

UNITED STATES PATENT OFFICE 2,267,488

METHOD AND APPARATUS FOR PRODUCING SAUSAGE SKINS

Oskar Walter Becker, Heidelberg, Germany, assignor to Naturin-Werk Becker & Co., Weinheim, Germany Application November 12, 1937, Serial No. 174,259
In Germany November 21, 1936

6 Claims. (Cl. 18—14)

It has already been proposed, for example in the applicant's British Patent Specifications Nos. 429,040 and 433,245, to produce artificial sausage skins or tubes by extruding a plastic and kneadable fibrous mass of animal origin from an annular nozzle. During the process of production air or another gas is blown from the nozzle head into the interior of the tube being formed and the inflated tube is withdrawn, dried and hardened.

The drying is effected by conveying the tube through long drying tunnels, in which hot air or other gas plays from all sides over the tube. The more or less dry tube is rendered waterproof by treatment with hardening liquids, thereafter again dried and rolled up.

It is an object of the invention to provide a method and apparatus for improving the drying of sausage skins.

With the above and other objects in view which will become apparent from the detailed description below, the invention is shown in the drawing, in which, Fig. 1 is a cross sectional view with parts in elevation showing one method of supporting sausage tubes during the drying and hardening step, Fig. 2 is a cross sectional view with parts in elevation illustrating the improved method and apparatus for supporting a sausage tube during the drying and hardening step, and Fig. 3 is an elevational view of a supporting roller on an enlarged scale.

In the continuous production of artificial sausage skins acccording to this known process the conveyance of the endless tube discharging from the nozzle during the operations of drying, hardening and renewed drying was effected, as shown in Fig. 1 of the accompanying drawing, by leading the tube $a$ over conveyor belts $b$ disposed at relatively large intervals, for example 10 to 20 metres apart, and driven in a suitable manner. Between the conveyor belts the tube travelled over a plurality of freely rotating supporting rollers $c$ disposed at intervals of 15 to 30 cms.

Since the tube is dried during its conveyance, the degree of drying is dependent on the rate of travel of the tube and the distance covered by the tube during the drying operation. With increasing production the rate of travel had to be increased and the drying stretch or track correspondingly lengthened. For economical use of the tube-extrusion process the drying stretch or track amounts to a few hundred metres.

It was found, however, that the elasticity of the tube was decreased with increasing rate of travel and prolonged drying stretch and in some cases the artificial sausage skins burst on filling or boiling.

Prolonged researches have shown that this reduction of elasticity is due to the particular method of conveyance. The tube composed of numerous intermatted fibres is stretched during its passage over the conveyor belts. This stretching induces an alteration in the fibrous structure, which in turn gives rise to an alteration in the mechanical properties, particularly the elasticity in the longitudinal direction. This disadvantageous effect on the tube of the process of conveyance is the greater, the longer is the drying stretch or track and the longer time the tube is subjected to tension. Experiments have shown that the tube in the process of conveyance hitherto employed is stretched by 30 to 55%. Thus, for example, a portion of tube 1 metre in length on leaving the nozzle in the process of drying and hardening becomes 1.30 to 1.55 metres in length.

On the other hand, in order to maintain the tube width as produced by the diameter of the annular nozzle, it is necessary to produce in the interior of the tube a considerable excess pressure, for example from 50 to 60 mms. water column, by blowing gases into the tube. If a relatively low excess pressure is employed, a tube is produced, the diameter of which, owing to the stretching during conveyance, is smaller than that of the annular nozzle. If, however, a relatively high excess pressure as aforesaid is employed, the mechanical properties, particularly the elasticity in the transverse direction, are impaired.

According to this invention it has been found that elastic and shrinkable artificial sausage skins or tubes, which adapt themselves far more efficiently to the sausage contents may be produced by withdrawing and drying the tubes formed by extruding animal fibrous masses from annular nozzles, without tension.

The tube may for example be conveyed whilst avoiding tension in the longitudinal direction, by leading the tube over driven rollers or belts and inserting between the latter and the drive friction clutches, which disconnect the conveying member from the drive when the tension exceeds the permissible limit for the tube.

The conveyance of the tube is effected with particular advantage by leading the tube over relatively large driven rollers, each of which contains one or more freely rotatable rollers in one or more recesses. The bearing surfaces of the rollers may with advantage be covered with textile materials.

An embodiment of the process of this invention is illustrated in Figure 2 of the accompanying drawing. In this embodiment the tube $a'$ is led over the driven large rollers $d$, which are disposed at intervals of 0.5 metre and more. Each of these rollers is provided with a cut-out portion or recess, in which a freely rotating, loose running roller $e$ is disposed. The tube, so long as it is in contact with the roller $d$, is impelled and moved forward. When the tube during this forward movement comes on to the freely rotating roller $e$, the tension is released and the stretched tube has the opportunity of again contracting by virtue of its elastic property.

Fig. 3 shows a supporting roller on enlarged scale, wherein the freely movable roller extending from the tread is radially shiftable. The roller $e$ is connected with the supporting roller $d$ by laterally disposed arms $h$. The latter has a slot $i$ through which two attaching screws extend. After loosening the attaching screws the roller $e$ with the arms $h$ can be moved radially outwardly or inwardly. The arms $h$ are set in the desired position by means of the screws $k$. The recess $l$ is oblong in order to move the roller $e$.

According to a particularly advantageous embodiment of this invention the freely rotating rollers are so disposed that they project beyond the bearing surfaces of the driven rollers. In this embodiment the freely rotating rollers may also be radially displaceable, whereby it is possible to regulate the extent by which they project from the bearing surfaces of the driven rollers and at the same time also the degree of release of tension.

The driven rollers are with advantage so adjusted that the freely rotating compensating rollers at any moment are successively displaced relatively to one another, so that the tube periodically passes over these compensating rollers and is relaxed or relieved from tension. In this way the fixed points produced by the immovably disposed conveyor belts in the conveying processes hitherto employed are avoided.

The new process of this invention possesses considerable advantages. During the process of conveyance the tube in accordance with the adjustment of the freely rotating rollers is not, or only slightly, stretched, in some cases owing to its contractibility it is even shortened and thickened. This tensionless conveyance results in the production of an elastic tube, which on being filled with sausage material adapts itself to the latter, i. e. takes part in the extension and contraction of the sausage filling far more efficiently. Moreover the conveying process of this invention is much more simple to regulate than the known process, since the individual parts of the conveying device are centralised and reduced in number.

It has been further found according to this invention that the elasticity of the tube can also be increased in the transverse direction by employing a low internal excess pressure in the tube. Whereas, as hereinbefore mentioned, in the known process an internal excess pressure of from 50 to 60 mms. water column was necessary in order to maintain the desired width of tube, it is possible in the process of this invention to prevent any alteration in the diameter of the tube by using an excess pressure of only 5 to 6 mms.

Protein-containing fibrous pastes, obtained by the decomposition and mechanical comminution or shredding of animal starting materials, such as hide, hide parts, de-tanned leather, sinews, muscles, flesh and the like, are used as starting materials for the production of the artificial sausage skins or tubes of this invention. The decomposition may be effected by treatment with swelling chemicals, for example lyes or acids. If desired, different swelling agents or swelling agents of different concentrations may also be employed. The swelling treatment is continued until the protein-containing starting material can be converted by the mechanical treatment into a pasty, plasic and kneadable fibrous mass. In this condition the fibrous mass contains at least 80%, preferably 85% and more, of non-expressible swelling water. The decomposition of the protein-containing starting material may also be effected by a heat treatment in the presence of water, by treatment with enzymes or by the application of several decomposition methods.

In certain circumstances the decomposed starting material can be directly extruded through annular nozzles. In general however the swollen starting material is subjected to a comminuting treatment in one or more stages, which must be so conducted that the fibrous structure of the starting material, particularly the length of the fibres, is preserved.

Finally the resulting mass of swollen fibres is homogenised by treatment in kneading or mixing machines. The resulting fibrous mass is extruded through annular nozzles whilst blowing air into the interior of the tube being formed. Different annular nozzles may be employed. Preferably however annular nozzles with movable, particularly rotatable, parts are employed. In this case the nozzle core or the nozzle jacket or both nozzle parts may be rotatable. In the latter case the two nozzle parts may rotate in the same direction or in opposite directions at the same speed or at different speeds. The described method of producing the tube substances and the described type of nozzles employed do not constitute a part of this invention. The tube formed is conveyed and dried without tension in accordance with this invention and is hardened, again dried and rolled up in known manner.

What I claim is:

1. In a process for the production of elastic artificial sausage skins by extruding a plastic, kneadable fibrous mass of animal origin through annular nozzles whilst blowing gases into the interior of the tube being formed and drying the resulting product, the improvement which comprises withdrawing and drying the tube discharging from the nozzle without tension, and blowing gas into the interior of the tube so that a pressure in excess of atmospheric pressure of only at most six millimetres of water results.

2. In an apparatus for producing elastic artificial sausage skins from an extruded plastic kneaded fibrous mass of animal origin which has been extruded through an annular nozzle while gases have been blown into the interior of the tube so formed and drying the resultant product comprising a driven roller for supporting said tube being discharged from the nozzle and a freely rotatable member located on said roller, the periphery of which member extends beyond the periphery of the driven roller and is in contact with said tube for intermittently supporting said tube, whereby the tube may be dried without destroying the elasticity thereof.

3. In an apparatus for producing elastic artificial sausage skins from an extruded plastic kneaded fibrous mass of animal origin which has been extruded through an annular nozzle while gases have been blown into the interior of the tube so formed and drying the resultant product comprising a plurality of driven rollers for supporting the tube discharged from said nozzle and a freely rotatable member in at least one of said rollers projecting beyond the bearing surface of said rollers and extending along a substantial length of said rollers, so that it contacts the tube being treated whereby the tube is dried without destroying the elasticity thereof.

4. In an apparatus for producing elastic artificial sausage skin from an extruded plastic kneaded fibrous mass of animal origin which has been extruded through an annular nozzle while gases have been blown into the interior of the tube so formed and drying the resultant product comprising a series of driven supporting rollers for said tube and a second series of freely rotatable rollers arranged in said supporting rollers projecting beyond the bearing surface and extending along a substantial length of a supporting roller, so that they contact the tube being treated for intermittently supporting and releasing tension upon the supported tube.

5. In an apparatus for producing elastic artificial sausage skins from an extruded plastic kneaded fibrous mass of animal origin which has been extruded through an annular nozzle while gases have been blown into the interior of the tube so formed and drying the resultant product comprising a series of driven supporting rollers for the tube discharged from said nozzle, one of said rollers having a recess therein and a freely rotatable and radially displaceable roller located in said recess, which freely rotatable roller extends along a substantial length of the supporting driven rollers and can be adjusted to extend beyond the periphery of the supporting roller, so that it contacts the tube being treated.

6. In an apparatus for producing elastic artificial sausage skins from an extruded plastic kneaded fibrous mass of animal origin which has been extruded through an annular nozzle while gases have been blown into the interior of the tube so formed and drying the resultant product comprising a series of driven supporting rollers for the tube discharged from said nozzle, one of said rollers having a recess therein and a freely rotatable and radially displaceable roller located in said recess, which freely rotatable roller extends along a substantial length of the supporting driven rollers so that it contacts the tube being treated, the periphery of said freely rotatable roller in said recess projecting beyond the bearing surface of the driven supporting roller.

OSKAR WALTER BECKER.